A. C. MASON.
DRILL PRESS.
APPLICATION FILED JUNE 1, 1918.
1,330,130.
Patented Feb. 10, 1920.
6 SHEETS—SHEET 1.
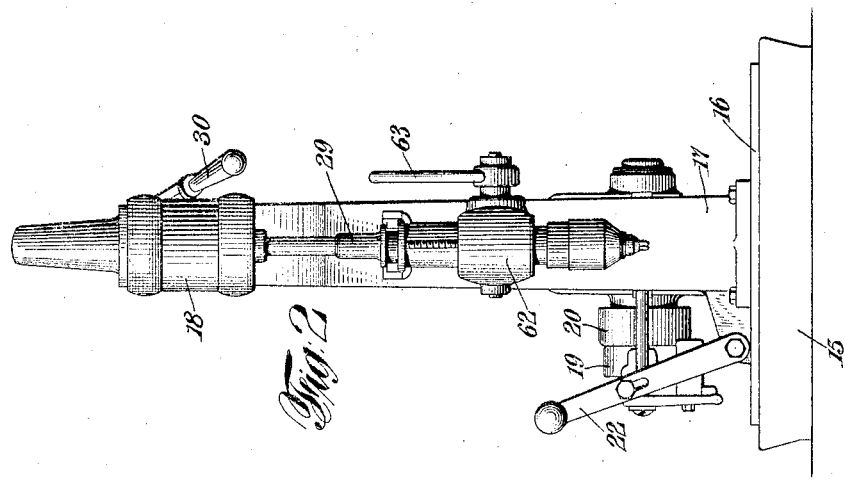
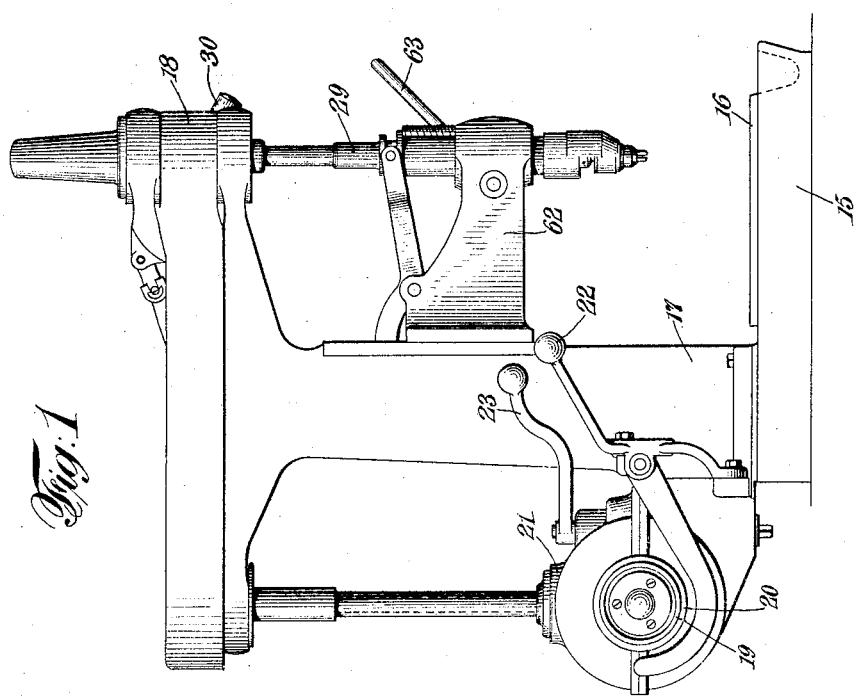
INVENTOR
Arthur C. Mason
BY
ATTORNEY

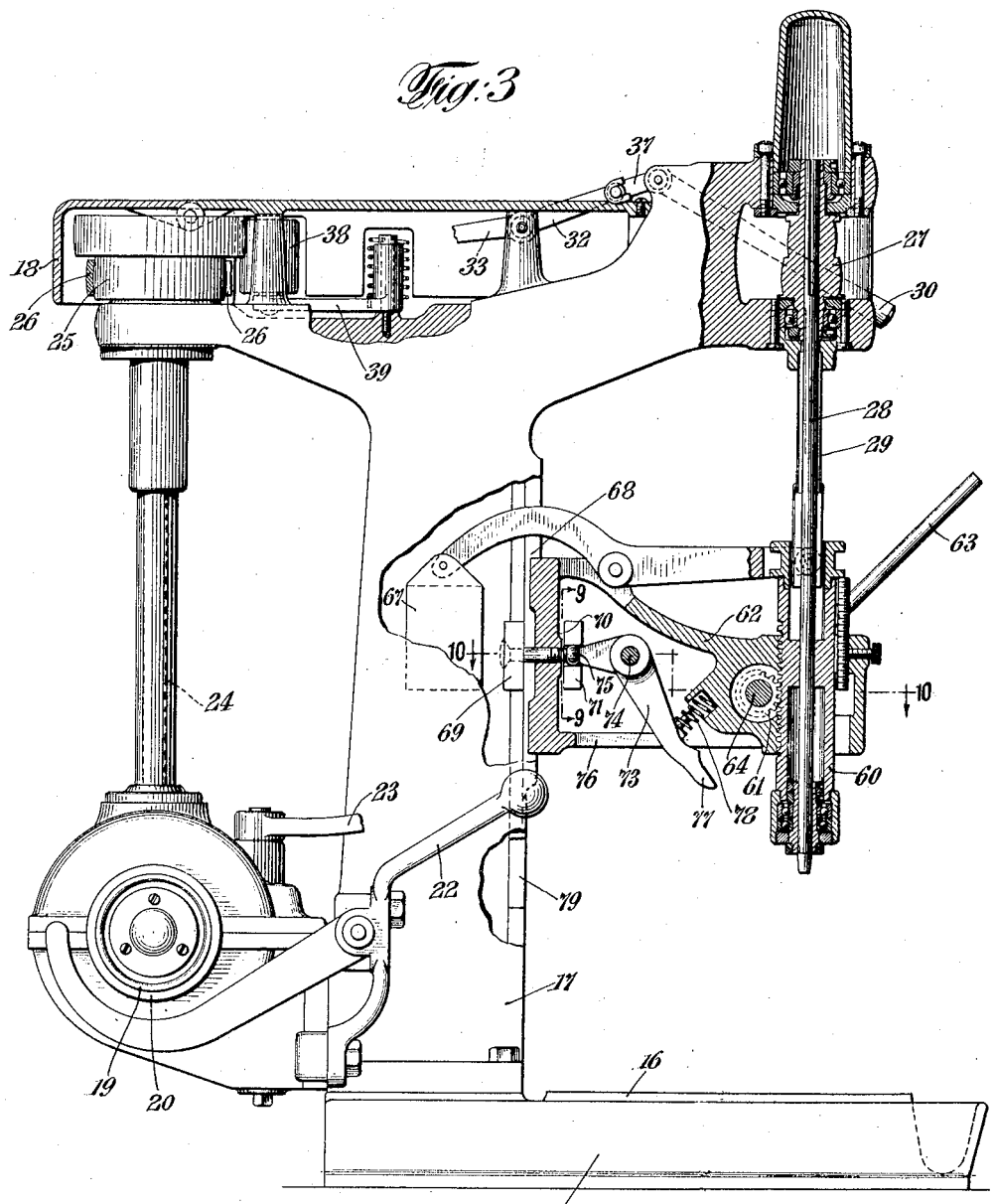

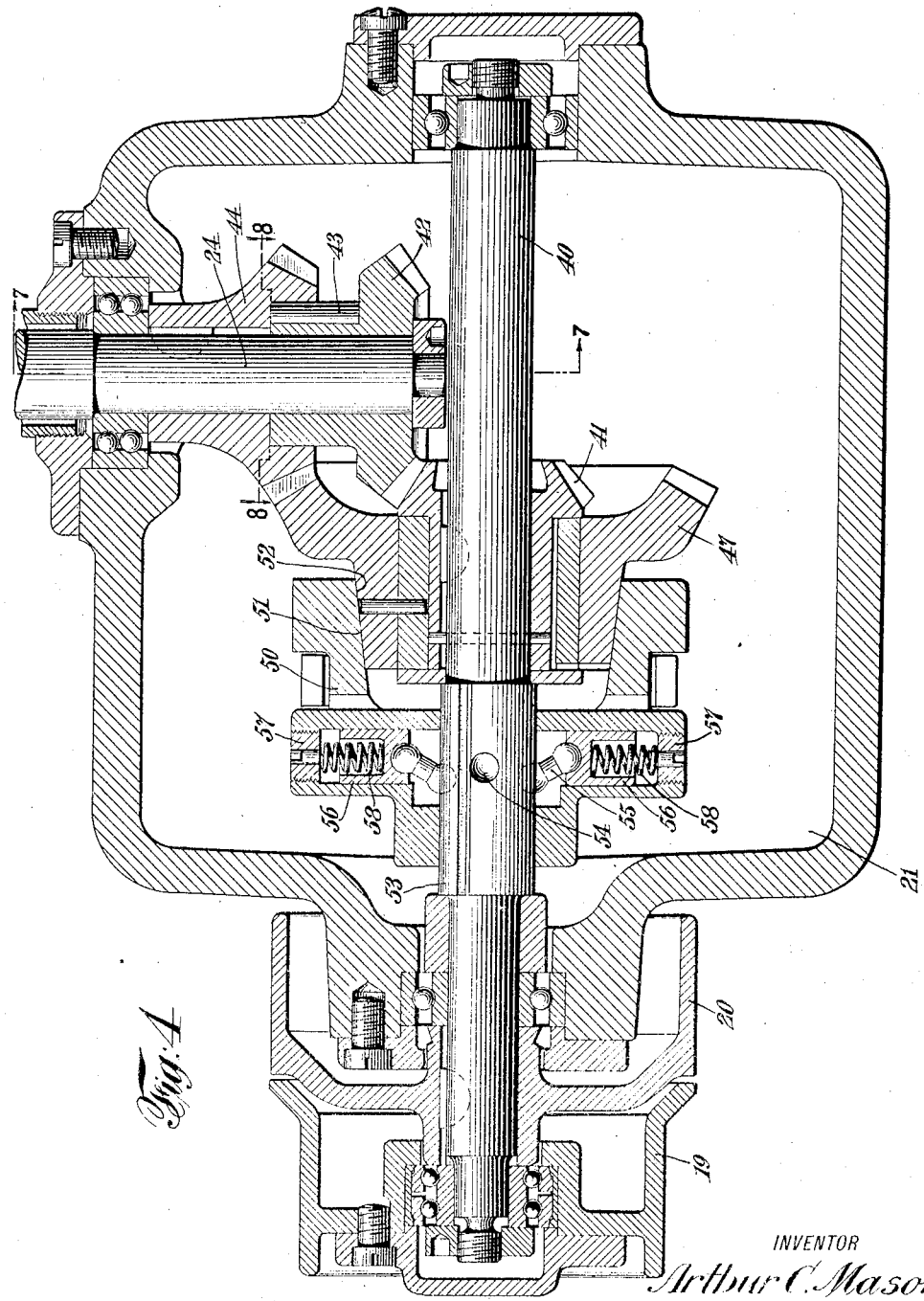

A. C. MASON.
DRILL PRESS.
APPLICATION FILED JUNE 1, 1918.
1,330,130.
Patented Feb. 10, 1920.
6 SHEETS—SHEET 4.
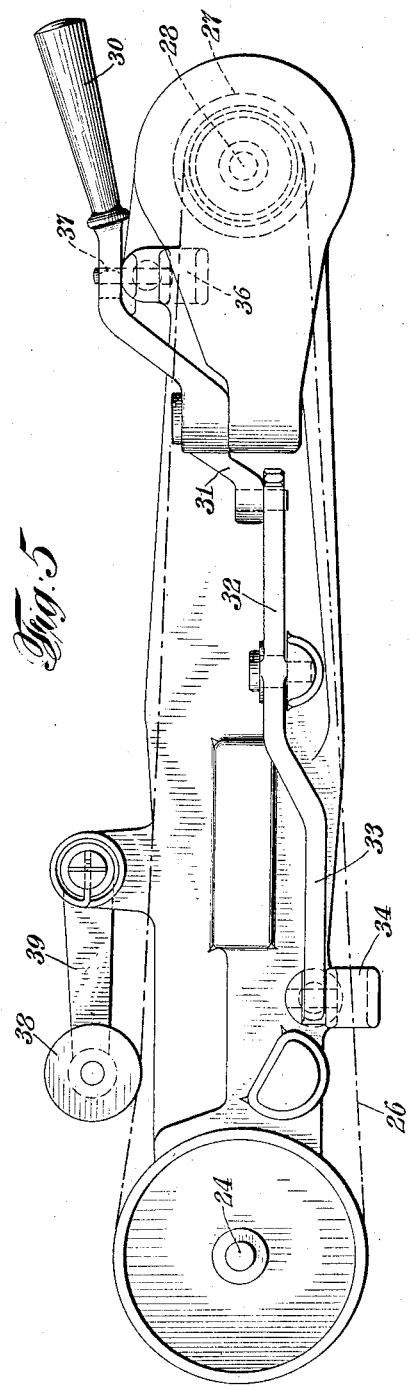
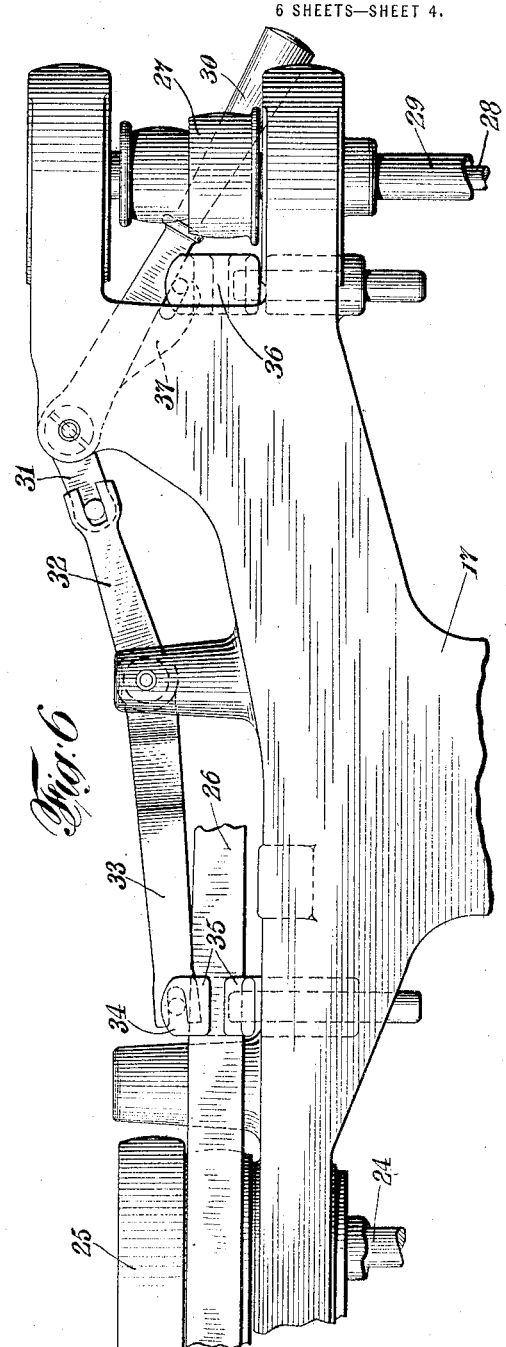
INVENTOR
Arthur C. Mason
BY
ATTORNEY

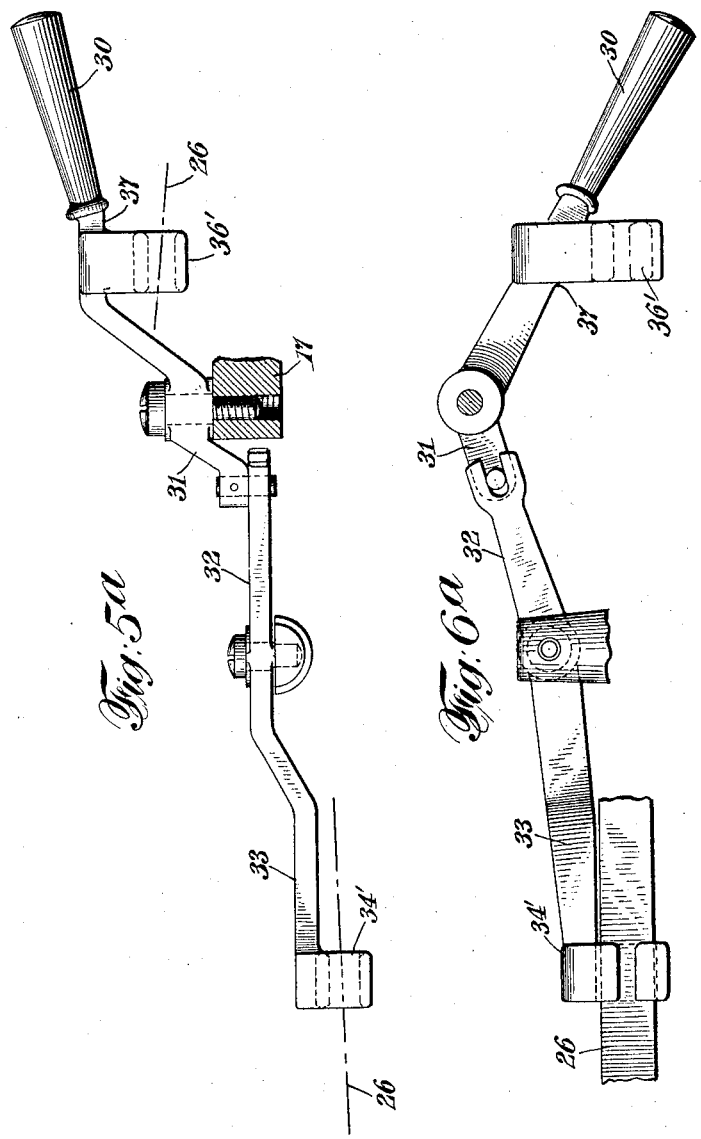

A. C. MASON.
DRILL PRESS.
APPLICATION FILED JUNE 1, 1918.
1,330,130.
Patented Feb. 10, 1920.
6 SHEETS—SHEET 6.
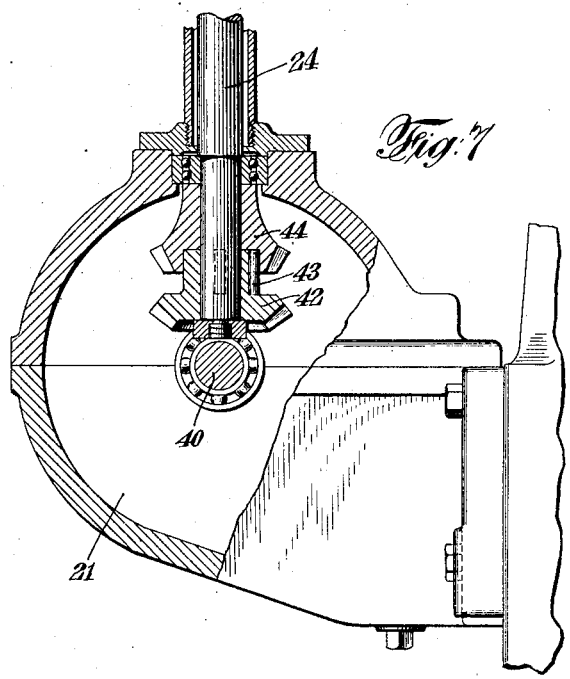
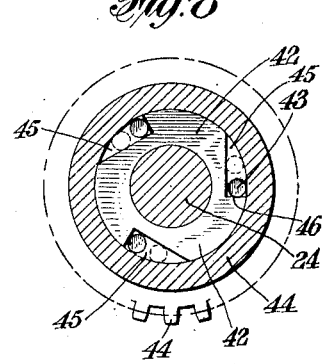
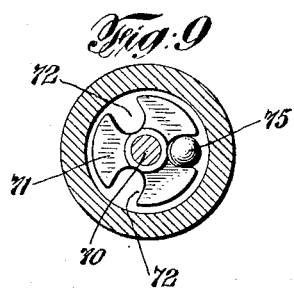
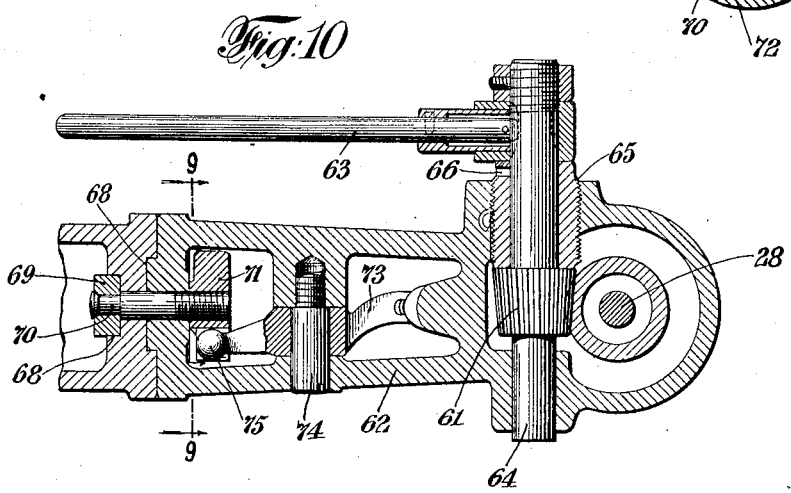
INVENTOR
Arthur C. Mason
BY
Fred'k Schuch
ATTORNEY

UNITED STATES PATENT OFFICE.

ARTHUR C. MASON, OF PATERSON, NEW JERSEY.

DRILL-PRESS.

1,330,130.   Specification of Letters Patent.   Patented Feb. 10, 1920.

Application filed June 1, 1918. Serial No. 237,780.

*To all whom it may concern:*

Be it known that I, ARTHUR C. MASON, a citizen of the United States, and a resident of Paterson, in the county of Passaic and State of New Jersey, have invented certain new and useful Improvements in Drill-Presses, of which the following is a specification.

The invention relates to drill presses, more particularly of the so-called "sensitive" type, and adapted for a multiplicity of speeds of the drill spindle.

It has for its object to provide a machine of this character which shall have great rigidity under the highest speeds, and provided with particular means for effecting the desired range thereof. A further object of the invention consists in means to conveniently take up any back lash in the spindle feeding mechanism, as well as to provide a novel clamping device in connection therewith. A still further object of the invention resides in certain details of the drive mechanism, whereby the required speed variations are obtainable.

The nature of the invention will be best understood when described in connection with the accompanying drawings, in which—

Figure 1 illustrates the novel drilling machine in side elevation; and Fig. 2 illustrates the same in front elevation.

Fig. 3 is a detail side elevation of the machine with portions thereof shown in section.

Fig. 4 is a detail sectional view through the transmission casing.

Figs. 5 and 6 are respectively a plan and side elevation of the upper portion of the machine with casing removed, and illustrate the belt shifting unit.

Figs. 5ª and 6ª are fragmentary views illustrating a modification in the belt shifting mechanism.

Fig. 7 is a detail sectional view taken on the line 7—7, Fig. 4; and Fig. 8 is a similar view taken on the line 8—8, Fig. 4.

Fig. 9 is a detail sectional view taken on the line 9—9, Fig. 3; and Fig. 10 is a similar view taken on the line 10—10, Fig. 3.

Similar characters of reference designate corresponding parts throughout the several views.

Referring to the drawings, more particularly to Figs. 1 to 3 thereof, 15 designates a suitable base having at its forward portion the work table 16 and supporting a pillar 17. Surmounting the latter is a suitable casing 18 inclosing the pulleys and belt shifting mechanism, hereinafter more fully described. At the rear of the pillar are mounted the loose and tight pulleys 19 and 20 respectively, as well as the transmission casing 21. A lever 22 is pivoted to the said base and is designed to shift the belt (not shown) from one pulley to the other, as is well understood; and a lever 23, mounted on the casing 21, is provided to effect a change of speed, as will be hereinafter more fully described. A shaft 24 extends from the transmission casing vertically to the pulley casing 18 and communicates the rotation of tight pulley 20 to stepped cone pulleys 25 at its upper end. Power is transmitted through a belt 26 from the latter to a similar but reversely arranged set of pulleys 27 keyed to and rotating with the spindle 28 having a surrounding telescopic sleeve 29.

To conveniently shift the belt from one step of the pulleys 25 and 26 to a succeeding one, suitable mechanism acting simultaneously at both sets of pulleys is provided, and operated manually through a lever or belt shifted handle 30 extending forwardly from the pulley casing 18. Reference being had more particularly to Figs. 5 and 6 of the drawings, it will be noted that the handle 30 is pivotally secured to the upper portion of pillar 17, and that its inner end 31 engages one arm 32 of a lever also pivoted to the said pillar and having its other arm 33 engaging a belt shipper 34 in the nature of a bifurcated member slidably mounted in the top of the pillar 17, embracing the sides of the belt and having fingers 35 projecting over the face of same. A similar shipper 36 is mounted in the forward end of the pillar 17 and is engaged by a forward extension 37 of the lever or handle 30. In this manner, when the said handle 30 is operated, movement is communicated to both of the shippers to shift them simultaneously and in the same direction, thereby correspondingly moving the belt 28 from one step of the pulleys 25 and 26 to a succeeding one thereof. When the shifting movement is not excessive, the respective shippers 34' and 36' may be carried directly by and form part of the arms 33 and 37, as shown in Figs. 5ª and 6ª. They then move with said arms, and no loose connections and guide members are necessary, as in the embodiment illustrated in Figs. 5 and 6.

To maintain the belt 26 always under proper tension, a spring-urged idler 38, secured at the free end of an arm 39 pivotally attached to the top of pillar 17, bears against the outer face of said belt. By the construction hereinbefore described, a compact and simple shifting unit is afforded to effect a change of speed of the spindle 27. Although but two steps have been shown with respect to the pulleys, it is to be understood that further steps may be added, if desired.

The manner of transmitting power from the tight pulley 20 to shaft 24 is shown in detail in Figs. 4, 7 and 8 of the drawings, said pulley for this purpose being suitably connected to a power shaft 40 to rotate same. This shaft rotates a bevel wheel 41 engaging a similar wheel 42 mounted about the vertical shaft 24, but not directly connected thereto, and free to rotate thereon. The connection is effected through a series of vertically located rollers 43 and a bevel gear wheel 44 secured to said shaft, said wheel 44 being designed also for the high speed connection. The hub of bevel gear wheel 42 is provided, moreover, with a plurality of recesses 45 cut inwardly from its periphery and designed to receive the corresponding rollers 43, shoulders 46 being provided in the said hub along a radius thereof and against which the rollers abut, the other wall of the recess being at right angles thereto and forming a contracted end of the recess with the inner surface of the wheel 44. A further bevel gear wheel 47 is mounted about the power shaft 40, or rather about the gear wheel 41 thereon, and loosely with reference to same. This wheel, in turn, is in constant mesh with the bevel gear wheel 44 aforesaid, and communicates rotation through same directly to the shaft 24 when the clutch mechanism, hereinafter described, is brought into action, as shown in Fig. 4. The ratio of the latter transmission provides for a greater speed of the wheel 44 in this instance than when the transmission is through the rollers 43; and the same merely abut shoulder 46 of said gear wheel 42 without effect thereon.

To clutch in the said gear wheel 47, a friction clutch device 50 is employed, having a surface 51 engaging the periphery 52 of the hub of said wheel. This is accomplished by moving said clutch inwardly through the action of lever 23, the construction being such that the said clutch is locked in one or the other positions—Fig. 4 showing the clutch thrown in for driving wheel 47, and the transmission being accomplished directly through bevel wheels 47 and 44, as aforesaid. The mechanism for locking the clutch consists of an enlargement 53 of the shaft 40, and upon which the clutch 50 is longitudinally adjustable, the said enlargement being provided with suitable sockets 54 to receive the ball ends of links or toggles 55 whose other ends are mounted in spring-urged heads or piston 56 movably retained in the clutch. The degree of pressure exerted upon these links or toggles may be conveniently adjusted by screw caps 57 bearing against the springs 58 and mounted in the said clutch. In shifting the clutch, the links are straightened against the opposition of springs 58, rocking in the sockets 54 until they pass beyond the vertical center line of said links; whereupon, they snap into position upon the opposite side of said center line and lock the clutch in the new position. When the clutch is free and the gear wheel 41 only is in action, wheel 42 driven thereby will first move relatively to the then stationary wheel 44 until the clutch rollers 43 lock in the converging wall portions of the recesses 45, and inner surface of wheel 44, as shown in dotted lines, Fig. 8, whereupon, the rotation of the wheel 42 will be communicated to the wheel 44 and through same to the pulley shaft 24.

To permit of the feeding of the drill spindle 28, the same is surrounded by and movable with a sleeve 60 provided with rack teeth and adapted to be engaged by a rotary toothed member or conical pinion 61. The latter is mounted to rotate in a carriage 62 and operated through a feed handle 63 projecting from the forward part of the machine. The toothed member 61 is in the nature of a beveled pinion (Fig. 10) which is longitudinally adjustable with its shaft 64 as through a collar 65 screwed into the carriage 62 and abutting the head of said pinion. In this manner, any back lash or lost motion between the rack teeth of the sleeve 60 and the pinion may be taken up by suitably adjusting said pinion and its shaft, the collar for this purpose being provided with a recess 66 to receive a handle or other suitable tool (not shown) to effect rotation of said collar. Sleeve 60, moreover, is suitably counterweighted by a weight 67 pivotally supported on the carriage 62 in manner well understood.

In order to effect a more rapid change in the position of the spindle, and an instantaneous locking and unlocking of the carriage 62, the same is made slidable along the pillar 17 and clamped thereto in following manner: Ways 68 are provided in the interior of the pillar, against which is adapted to bear a block or nut 69 held to one end of a bolt 70 whose other end is threaded and passes through the carriage 62, its projecting threaded end having rotatable thereon a disk member 71 (Fig. 9) provided with a plurality of notches or slots 72 extending radially inward from the circumference. This disk serves as a nut to tighten the carriage to the pillar when rotated sufficiently, and is so set that a slight rotation in the reverse direction will serve to loosen the connections sufficiently to permit of the shifting of the carriage.

To conveniently accomplish this, a lever 73 is fulcrumed in the interior of the carriage, as by means of a removable pin 74 extending therethrough. The inner arm of this lever terminates in a ball 75 fitting within one of the said slots or notches 72, while the outer arm of the lever projects beyond the carriage through a slot 76 thereof, and has a handle 77 by which the lever may be actuated in opposition to a spring 78 normally urging the lever in a predetermined direction, such that its inner arm will serve to rotate the disk 71 in a direction to tighten the carriage to the pillar. When it is desired to loosen this carriage from its pillar to effect the shifting of the spindle, it is necessary merely to draw the handle 77 toward the said spindle, thereby rotating disk 71 in a direction to loosen the respective parts. Should the various parts for any reason undergo an appreciable wear, pin 74 may be removed by unscrewing the same from the carriage, the inner arm of lever 73 with ball 75 withdrawn from the slot 72 of the disk, and the latter then given a rotation such that the next slot, or perhaps the second following, will be engaged by the said ball, when the parts are restored to their normal position. In this manner, a very simple and effective means of holding the carriage to the pillar is obtained, and at the same time allows of the taking up of any slack due to wear or other causes. Or, an opening 79 may be provided at the foot of the ways which is sufficiently large to release the block 69 and thereby the entire carriage, as well as the spindle 28. Either the block 69 or disk 71, or both, may then be adjusted and the parts returned. This bodily removal of carriage and spindle is particularly valuable in the original assembly of the machine.

I claim:

1. A drill press comprising a frame, a reciprocable carriage mounted on the frame, and means to clamp the carriage to the frame, including a spring-held lever pivoted to the carriage and locking means controlled by said lever.

2. A drill press comprising a reciprocable carriage, a frame provided with ways, a block movable therein, a screw passing through said block into said carriage, a threaded member thereon adapted to be rotated to clamp the carriage to said ways, and a spring-held lever pivoted to the reciprocable carriage to rotate said member.

3. A drill press comprising a reciprocable carriage, a frame provided with ways, a block movable therein, a screw passing through said block into said carriage, a threaded member thereon adapted to be rotated to clamp the carriage to said ways, a lever pivoted to the reciprocable carriage, one end thereof engaging the threaded member and the other affording an actuating handle, and a spring mounted in said carriage, having one end thereof engaging said actuating handle to urge the lever in a direction to rotate the disk and tighten the carriage.

4. A drill press comprising a reciprocable carriage, a frame provided with ways, a block movable therein, a screw passing through said block into said carriage, a threaded disk thereon provided with a plurality of circumferential notches, and a lever pivoted to the reciprocable carriage, having a ball at one end fitting a notch of said disk to rotate the same to clamp the carriage to said ways.

5. In a drill press: feed mechanism for the spindle thereof, comprising a reciprocable carriage carrying the same; a sleeve slidable relatively to the carriage; a beveled pinion mounted in said carriage, and means to adjust the same along its axis of rotation; a rack member engaging said pinion and connected with said spindle; and means to rotate said pinion.

6. In a drill press: feed mechanism for the spindle thereof, comprising a reciprocable carriage carrying same; a sleeve slidable relatively to the carriage; a shaft mounted in said carriage, and a beveled pinion rotatable with said shaft; a collar about said pinion shaft, screwed into the carriage and abutting the head of the pinion, said collar being adjustable along the shaft to move the pinion and shaft; a rack member engaging said pinion and connected with said spindle; and means to rotate said pinion.

Signed at Paterson, in the county of Passaic and State of New Jersey, this 27th day of May, A. D. 1918.

ARTHUR C. MASON.